US012379078B1

(12) United States Patent
Ban

(10) Patent No.: US 12,379,078 B1
(45) Date of Patent: Aug. 5, 2025

(54) LIGHT SOURCE MODULE AND DECORATIVE LIGHT STRING

(71) Applicant: SHENZHEN ANDYSOM LIGHTING CO., LTD., Guangdong (CN)

(72) Inventor: Zhuoya Ban, Guangdong (CN)

(73) Assignee: SHENZHEN ANDYSOM LIGHTING CO., LTD., Shenzhen (CN)

( * ) Notice: Subject to any disclaimer, the term of this patent is extended or adjusted under 35 U.S.C. 154(b) by 0 days.

(21) Appl. No.: 18/793,949

(22) Filed: Aug. 5, 2024

(30) Foreign Application Priority Data

Jul. 17, 2024 (CN) ......................... 202421694451.5

(51) Int. Cl.

| | |
|---|---|
| ***F21S 4/10*** | (2016.01) |
| ***F21V 15/01*** | (2006.01) |
| ***F21V 23/06*** | (2006.01) |
| ***F21V 31/00*** | (2006.01) |
| ***F21Y 113/17*** | (2016.01) |
| ***F21Y 115/10*** | (2016.01) |

(52) U.S. Cl.

CPC ................ *F21S 4/10* (2016.01); *F21V 15/01* (2013.01); *F21V 23/06* (2013.01); *F21V 31/005* (2013.01); *F21Y 2113/17* (2016.08); *F21Y 2115/10* (2016.08)

(58) Field of Classification Search

CPC ........ F21S 4/10; F21Y 2113/17; F21V 21/002

See application file for complete search history.

(56) References Cited

U.S. PATENT DOCUMENTS

| | | | | |
|---|---|---|---|---|
| 2004/0115984 A1* | 6/2004 | Rudy | F21S 4/10 | 439/405 |
| 2006/0197474 A1* | 9/2006 | Olsen | H05B 45/50 | 315/312 |
| 2011/0194292 A1* | 8/2011 | Tsai | F21V 31/04 | 362/231 |
| 2011/0209368 A1* | 9/2011 | Quaal | F21V 19/003 | 40/550 |
| 2013/0183779 A1* | 7/2013 | Pachler | G02B 6/4255 | 362/249.02 |
| 2014/0292211 A1* | 10/2014 | Huang | H05B 45/395 | 315/161 |
| 2015/0159844 A1* | 6/2015 | Flaherty | F21S 4/10 | 362/249.02 |
| 2024/0035652 A1* | 2/2024 | Dai | H05B 45/325 | |

FOREIGN PATENT DOCUMENTS

| | | | |
|---|---|---|---|
| DE | 202015102436 U1 * | 9/2016 | F21V 15/01 |
| DE | 102022114670 A1 * | 12/2023 | |
| EP | 2284438 A1 * | 2/2011 | F21S 4/10 |
| WO | WO-2012031874 A1 * | 3/2012 | F21S 2/005 |

* cited by examiner

*Primary Examiner* — Alexander K Garlen

(57) ABSTRACT

A light source module is provided and includes: a housing; a circuit board, received in the housing; and a light-emitting module, comprising at least two independent LED light beads that are integrally encapsulated and are configured to generate at least two colors of light correspondingly; wherein, each of the at least two independent LED light beads is electrically connected to the circuit board and has an operating voltage in a range of 6V-36V.

10 Claims, 6 Drawing Sheets

LIGHT SOURCE MODULE AND DECORATIVE LIGHT STRING

TECHNICAL FIELD

The present disclosure relates to the field of lamps for illumination and decoration, and in particular to a light source module and a decorative light string.

BACKGROUND

Stringed lamps, which are arranged into strings or twisted into a network, are often seen on branches of trees on streets, on a ceiling of some houses, and on eaves of various shops. This type of stringed lamps are also known as a light band in the art, formed by a cable and a plurality of light sources. For the light band in the art, a number plurality of single-colored light beads are connected to each other in series to form a single-colored light source, and a plurality of single-colored light sources are encapsulated and are connected to a control chip. A structure of the light band is complex, costs of manufacturing and materials are relatively high.

In addition, an encapsulation structure of each light source is not reasonable. Airtightness of the encapsulation is poor. After the light band is used for a long period of time, the encapsulation structure is not stable, resulting in the light sources being unable to be adapted to a complex outdoor environment, and a failure rate being increased dramatically. Furthermore, light from the lamp beads is relatively diffuses. When viewing from various directions, the light band generates low brightness. Enough brightness can be ensured only by increasing the number of lamp beads, causing structures of the light sources to be complex, brining adverse effects.

SUMMARY OF THE DISCLOSURE

In order to solve the above at least one of the above technical problems, the present disclosure provides a light source module and a decorative light string.

In a first aspect, the present disclosure provides a light source module, including:

a housing;

a circuit board, received in the housing; and a light-emitting module, including at least two independent LED light beads that are integrally encapsulated and are configured to generate at least two colors of light correspondingly. Each of the at least two independent LED light beads is electrically connected to the circuit board and has an operating voltage in a range of 6V-36V.

In some embodiments, the at least two independent LED light beads 220 at least include a R-type light bead, a G-type light bead, and a B-type light bead; and each of the at least two independent LED light beads 220 has an operating voltage of 18V.

In some embodiments, the housing includes an upper housing and a bottom housing; the upper housing includes a cover plate and a side plate extending along an edge of the cover plate; the cover plate and the side plate are integrally formed as a one-piece structure; the side plate is fixedly connected to the bottom housing; the cover plate, the side plate, and the bottom housing cooperatively define a receiving space for receiving the circuit board and the light-emitting module; the cover plate has a convex lens that allows light to pass through and is disposed at a position corresponding to the light-emitting module.

In some embodiments, an end of the side plate away from the cover plate is ultrasonically fused with the bottom housing to seal a gap between the upper housing and the bottom housing.

In some embodiments, the upper housing includes a convex ring that is integrally formed with the cover plate; the convex ring is protruding from a side of the cover plate away from the convex lens; the convex ring abuts against the circuit board; the convex ring, the cover plate and the circuit board enclose to cooperatively define an isolation cavity to receive the light-emitting module; the isolation cavity is located in correspondence with the convex lens.

In some embodiments, the circuit board and the bottom housing enclose to cooperatively define a cavity; a side of the bottom housing away from the cover plate defines a through hole that is communicating with the cavity and an exterior of the module; the side plate defines two opposing wire holes that are opposite to each other; the two wire holes are communicated with the cavity.

In some embodiments, the housing includes a transparent cover, a light-shielding cover, and the bottom housing; the light-shielding cover defines a light transmission hole and covers the transparent cover; the transparent cover has the convex lens that extends through the light transmission hole; the transparent cover and the light-shielding cover are both fixedly connected to the bottom housing.

In some embodiments, an end of the transparent cover away from the convex lens and an end of the light-shielding cover away from the convex lens are ultrasonically fused with the bottom housing; a side of the transparent cover facing the bottom housing is arranged with the convex ring; the convex ring abuts against the circuit board; the convex ring, the transparent cover and the circuit board enclose to cooperatively define the isolation cavity to receive the light-emitting module; the isolation cavity is located at a position corresponding to the convex lens; the circuit board and the bottom housing enclose to cooperatively define a cavity; a side of the bottom housing away from the convex lens defines a through hole that is communicated with the cavity and the exterior of the module; the bottom housing defines two wire holes that are opposite to each other; the two wire holes are communicated with the cavity.

In a second aspect, the present disclosure provides a decorative light string, including: a power adapter, a cable and at least two light source modules. Each of the at least two light source modules is the light source module according to the first aspect. The power adapter is electrically connected to the at least two light source modules through the cable, and adjacent light source module of the at least two light source modules are electrically connected to each other through the cable.

In some embodiments, the decorative light string comprises a switch box and a plug, the switch box is pluggably connected to the power adapter via the plug, the at least two light source modules are pluggably connected to the switch box via the plug, and the plug is further configured to pluggably connect to another decorative light string in order to extend the decorative light string.

According to the present disclosure, the light source module includes a light-emitting module that integrally encapsulates at least two independent LED lamp beads to generate at least two colors of light correspondingly. Each of the at least two independent LED lamp beads is electrically connected to a circuit board. An operating voltage of each LED lamp bead is in a range of 6V-36V. Therefore, distribution of components in the art in which a plurality of LED light beads are connected to each other in series and encapsulated, has been changed. In the present disclosure, each LED light bead is directly connected to the circuit board, complexity of a circuit of the light-emitting module is significantly reduced, saving costs for manufacturing and materials.

Additional aspects and advantages of the present disclosure will be illustrated in the following description and will be understood in detail from the subsequent description or understood by specific embodiments of the present disclosure.

BRIEF DESCRIPTION OF THE DRAWINGS

In order to more clearly illustrate the technical solutions in the embodiments of the present disclosure, the accompanying drawings for describing the embodiments will be introduced briefly in the following. Obviously, the accompanying drawings in the following description show only some of the embodiments of the present disclosure, and any ordinary skilled person in the art may obtain other drawings based on the following drawings without any creative work.

REFERENCE NUMERALS IN THE DRAWINGS

10—light source module, 20—switch box, 30—plug, 40—power adapter, 50—cable;

100—housing, 200—light-emitting module;

110—upper housing, 120—bottom housing; 111—cover plate, 112—side plate, 111*a*—convex lens, 111*b*—convex ring, 111*c*—isolation cavity;

121—cavity, 122—through hole, 123—wire hole;

130—transparent cover, 140—light shielding cover, 141—light transmission hole;

210—circuit board, 220—light bead.

DETAILED DESCRIPTION

In order to facilitate understanding the present disclosure, the present disclosure will be more thoroughly described below by referring to the accompanying drawings. Preferred embodiments of the present disclosure are given in the accompanying drawings. However, the present disclosure can be achieved in various forms and is not limited to the embodiments described herein. Rather, these embodiments are provided to enable the present disclosure to be understood more thoroughly and comprehensively.

It should be noted that when an element is "fixed" to another element, the element may be directly located on the another element, or an intermediate element may be arranged therebetween. When an element is "connected" to another element, the element may be directly connected to the another element or an intermediate element may be connected therebetween. Terms "vertical", "horizontal," "left", "right", and similar expressions are used herein for illustrative purposes only.

Unless otherwise defined, all technical and scientific terms used herein have the same meaning as commonly understood by any ordinary skilled person in the art. The terms used herein in the specification of the present disclosure are for the purpose of describing specific embodiments only and shall not be interpreted as limiting the present disclosure. The term "and/or" used herein includes any and all combinations of one or more listed relevant items.

Figure 1:
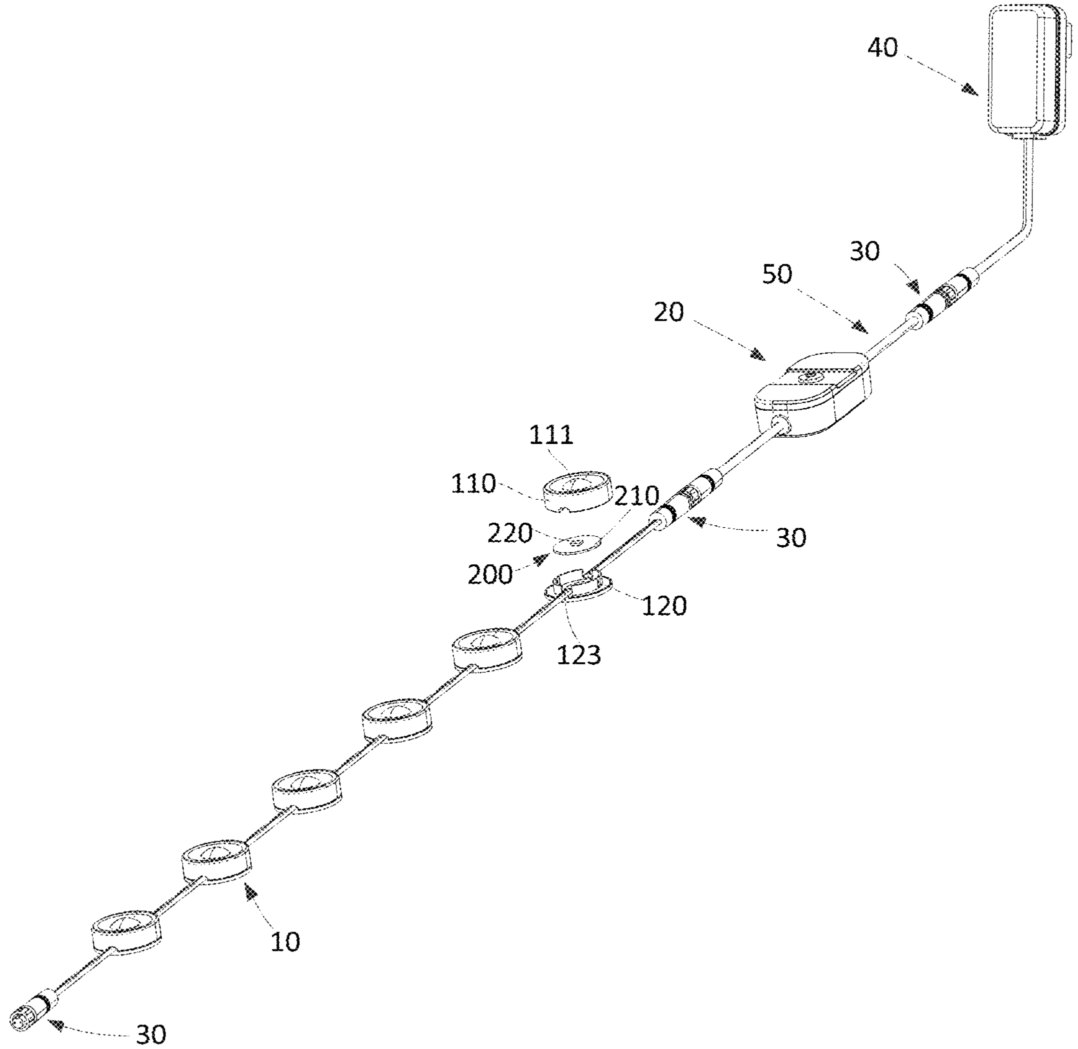
FIG. 1 is a perspective view of a decorative light string according to an embodiment of the present disclosure.
Figure 2:
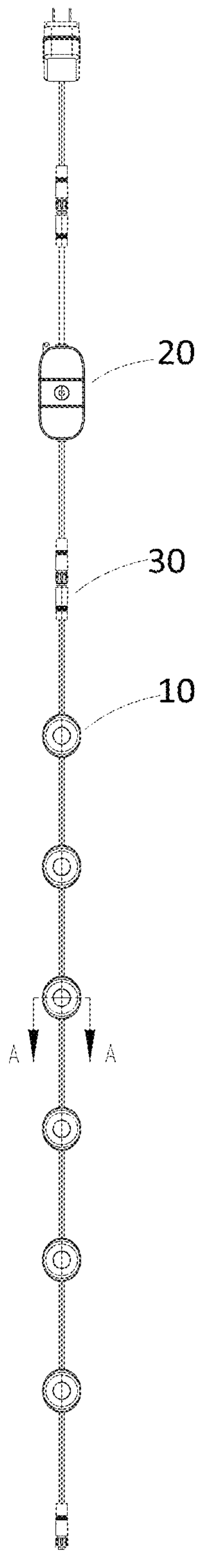
FIG. 2 is a plane view of the decorative light string according to an embodiment of the present disclosure.
Figure 3:
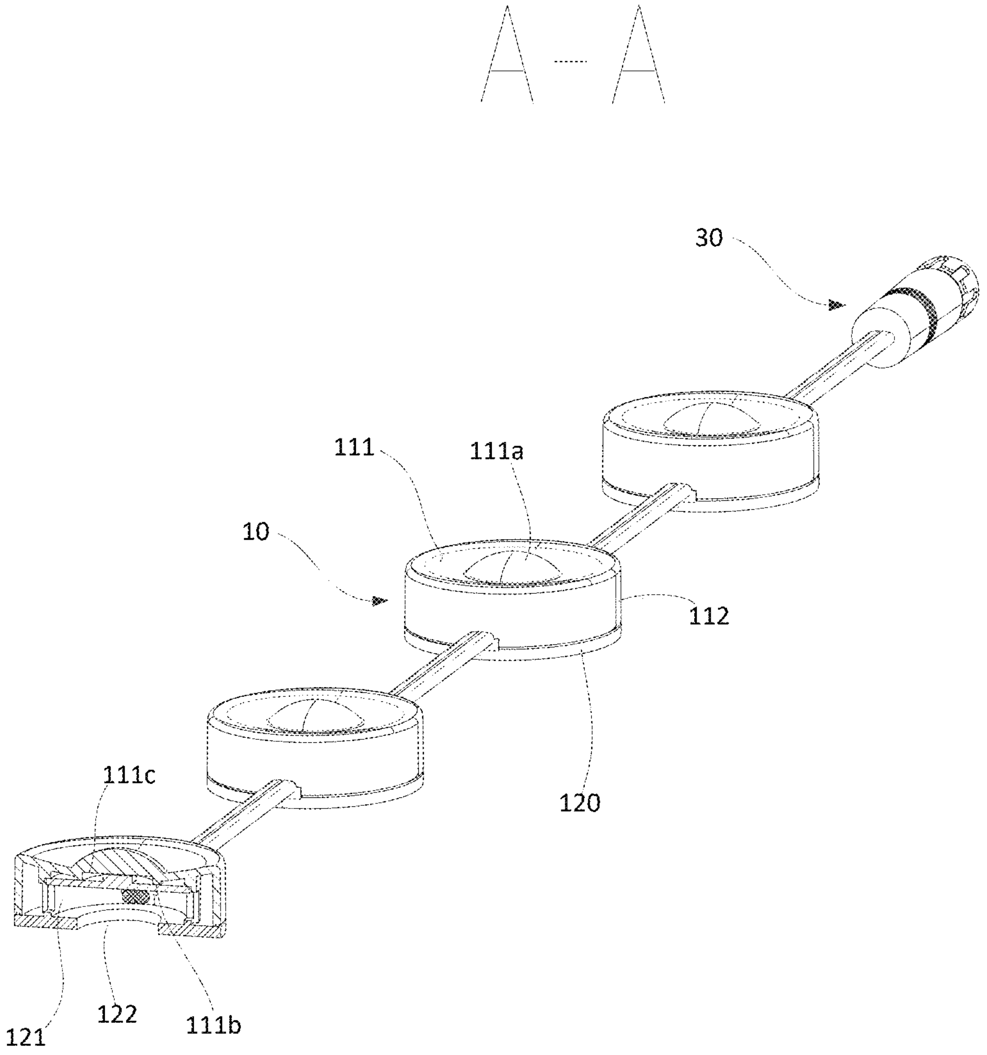
FIG. 3 is a perspective view of the decorative light string, being viewed from a cross-sectional viewing angle along the line A-A, shown in FIG. 2.

In a first aspect, the present disclosure provides a light source module 10, as shown in FIGS. 1 to 3, including: a housing 100, a circuit board 210, and a light-emitting module 200. The housing 100, which serves as an element-receiving component of the light source module 10, usually has a sealed receiving space. The circuit board 210 and the light-emitting module 200 are received in the housing 100. The circuit board 210, which is received in the housing 100, is a carrier of a control circuit to enable LED light beads 220 to emit light, enabling the light source module 10 to emit light. The light-emitting module 200 includes at least two independent LED light beads 220 that are integrally encapsulated, generating at least two colors of light correspondingly. In other words, each of the at least two independent LED light beads 220 is configured to emit light in one color. Each of the at least two independent LED light beads 220 is electrically connected to the circuit board 210 and has an operating voltage in a range of 6V-36V.

To be noted that, in the light source module 10 of the present disclosure, at least two LED light beads 220 are arranged, but the at least two LED light beads 220 are in different types from each other. The at least two LED light beads 220 are connected to the control circuit but are not in-series connected to each other. That is, the at least two LED light beads 220 are not connected in series to each other and then connected to the circuit board 210, and instead, each LED light bead 220 is directly electrically connected to the circuit board 210. The at least two LED light beads 220 are connected to each other in parallel on the circuit, and therefore, operations of the at least two LED light beads 220 do not interfere with each other. The single LED light bead can be realized by performing a multi-core encapsulation technology. The operating voltage range of each LED light bead 220 is in a range of 6V-36V. Therefore, the circuit board 210 in the present disclosure may include a voltage buck circuit. In some specific implementations of the embodiments of the present disclosure, the single LED light bead 220 includes at least a R-type light bead, a G-type light bead, and a B-type light bead. The operating voltage of each of the above light beads is 18 V. The R-type light bead is a LED light bead that emits a red light, the G-type light bead is a LED light bead that emits a green light, and the B-type light bead is a LED light bead that emits a blue light. Of course, in some implementations, a W-type light bead, which is a LED light bead that emits a white light, may be arranged. As various types of the LED light beads 220 operate cooperatively with each other, the light source module is enabled to emit light in various colors, and a string of light bands including a plurality of light source modules is formed. In this way, various colors or patterns may be generated according to design demands.

The light source module 10 in the present disclosure includes the light-emitting module 200 that integrally encapsulates at least two independent LED light beads 220 to correspondingly generate at least two colors of light. Each of the at least two independent LED light beads 220 is electrically connected to the circuit board 210 and has the operating voltage in the range of 6V-36V. Distribution of components in the art in which a plurality of LED light beads 220 are connected to each other in series and encapsulated, has been changed. In the present disclosure, each LED light bead is directly connected to the circuit board, complexity of a circuit of the light-emitting module 200 is significantly reduced, saving costs for manufacturing and materials.

Specifically, in combination with the first aspect of the present disclosure and the above implementation, in some embodiments, as shown in FIG. 3, the housing 100 includes an upper housing 110 and a bottom housing 120. The upper housing 110 includes a cover plate 111 and a side plate 112 extending along an edge of the cover plate 111. The cover plate 111 and the side plate 112 are integrally formed as a one-piece structure. The side plate 112 is fixedly connected to the bottom housing 120. The cover plate 111, the side plate 112, and the bottom housing 120 cooperatively define a receiving space for receiving the circuit board 210 and the light-emitting module 200. The cover plate 111 has a convex lens 111*a* that allows light to pass through and is disposed at a position corresponding to the light-emitting module 200. The housing 100 has a relatively simple structure, including two components only, i.e., the upper housing 110 and the bottom housing 120. The two components enclose to cooperatively define the receiving space, and therefore, the housing can be manufactured and assembled easily. In addition, as a part of the upper housing 110, the cover plate 111 corresponds directly to the light-emitting module 200, and the convex lens 111*a* is arranged on the cover plate 111. In this way, light emitted from the light-emitting module 200 is concentrated and emitted outwardly, and therefore, the light emitted out of the cover plate 111 of the light source module 10 is brighter. Brightness of the light source module 10 is improved without arranging a large number of LED light beads 220.

Further, specifically, in combination with the first aspect of the present disclosure and the above-described implementations, in some embodiment, an end of the side plate 112 away from the cover plate 111 is ultrasonically fused with the bottom housing 120 to seal a gap between the upper housing 110 and the bottom housing 120. In order to improve sealing performance of the housing 100 and to increase a structural service life, the upper housing 110 and the bottom housing 120 are fused to each other. Specific technical means can be referred to the description of the present disclosure, i.e., the upper housing 110 and the bottom housing 120 are "welded" to each other by ultrasonic fusion. In this way, the upper housing 110 and the bottom housing 120 are configured as a one-piece and integral structure, fully ensuring the sealing performance and the structural service life of the housing 100.

In combination with the first aspect and the above implementations, in some embodiments, as shown in FIG. 3, the upper housing 110 includes a convex ring 111*b* that is integrally formed with the cover plate 111. The convex ring 111*b* is protruding from a side of the cover plate 111 away from the convex lens 111*a*. The convex ring 1/1*b* abuts against the circuit board 210. The convex ring 1/1*b*, the cover plate 111 and the circuit board 210 enclose to cooperatively define an isolation cavity 1/1*c* to receive the light-emitting module 200. The isolation cavity 1/1*c* is located in correspondence with the convex lens 111*a*. By arranging the convex ring 1/1*b* on the cover plate 111, the convex ring 1/1*b* envelops the light-emitting module 200. In this way, the light emitted from the light-emitting module 200 is concentrated in the isolation cavity 111*c* between the convex ring 111*b* and the light-emitting module 200. The concentrated light is emitted only by passing through the convex lens 111*a* disposed in correspondence with the isolation cavity 111*c*, further improving the brightness of the light-emitting module 200. In addition, the isolation cavity 111*c* formed by the convex ring 111*b* prevents potential dust and water steam from entering and accumulating therein, extending the service life of the module.

In combination with the first aspect of the present disclosure and the above-described implementations, in some embodiments, as shown in FIGS. 1 and 3, the circuit board 210 and the bottom housing 120 enclose to cooperatively define a cavity 121. A side of the bottom housing 120 away from the cover plate 111 defines a through hole 122 that is communicating with the cavity 121 and an exterior of the module. The side plate 112 defines two opposing wire holes 123 that are opposite to each other. The two wire holes 123 are communicated with the cavity 121. By defining the through hole 122 in the bottom housing 120, heat dissipation of the circuit board 210 in the light source module 10 is effectively improved, ensuring that heat generated by the circuit board 210, due to long-term operation, is transferred to the exterior of the module through the through hole 122. The wire holes 123 defined in the side plate 112 provide spaces for cable access. The wire holes 123 are communicated with the cavity 121, sufficiently enabling the through hole 122 to be communicated to the exterior of the module through the wire holes 123.

Figure 4:
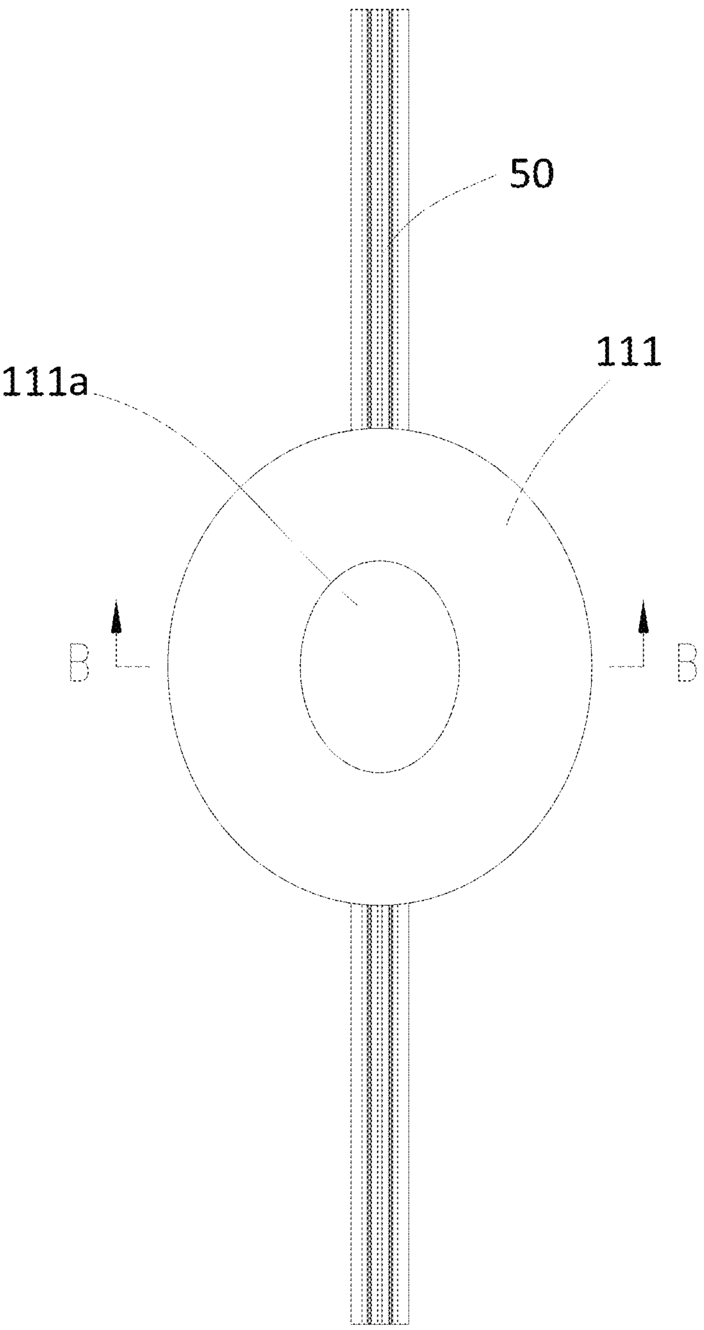
FIG. 4 is a plane view of a light source module according to another embodiment of the present disclosure.
Figure 5:
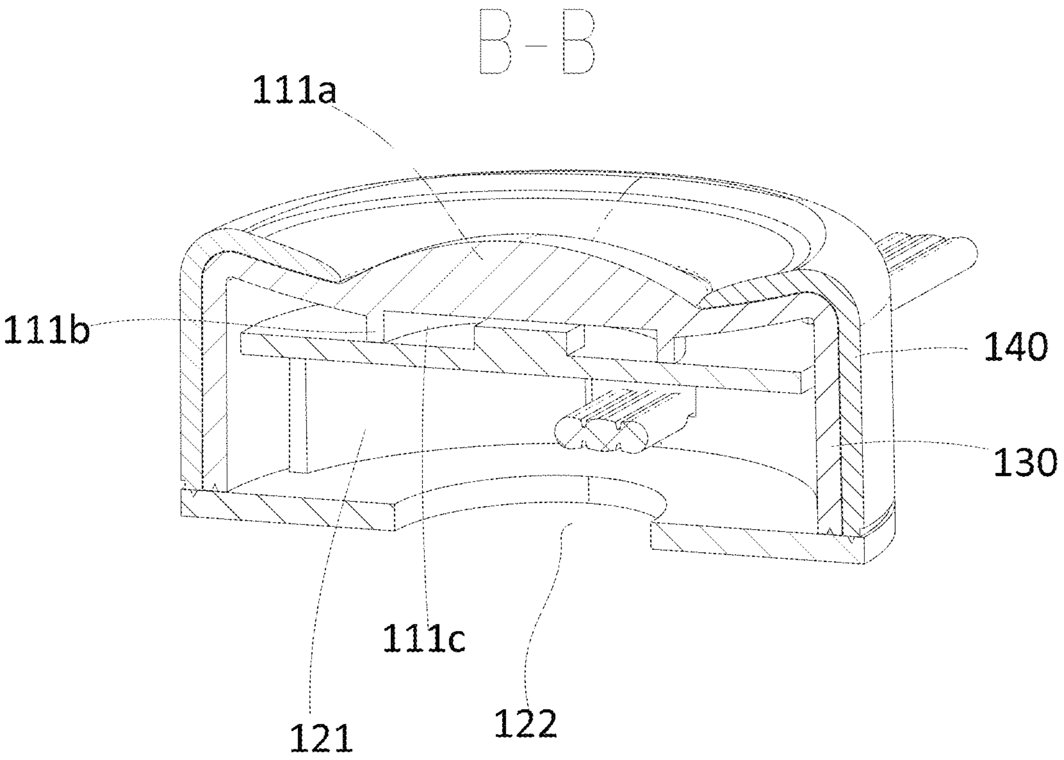
FIG. 5 is a perspective view of the light source module, being viewed from a cross-sectional viewing angle along the line B-B, shown in FIG. 4.
Figure 6:
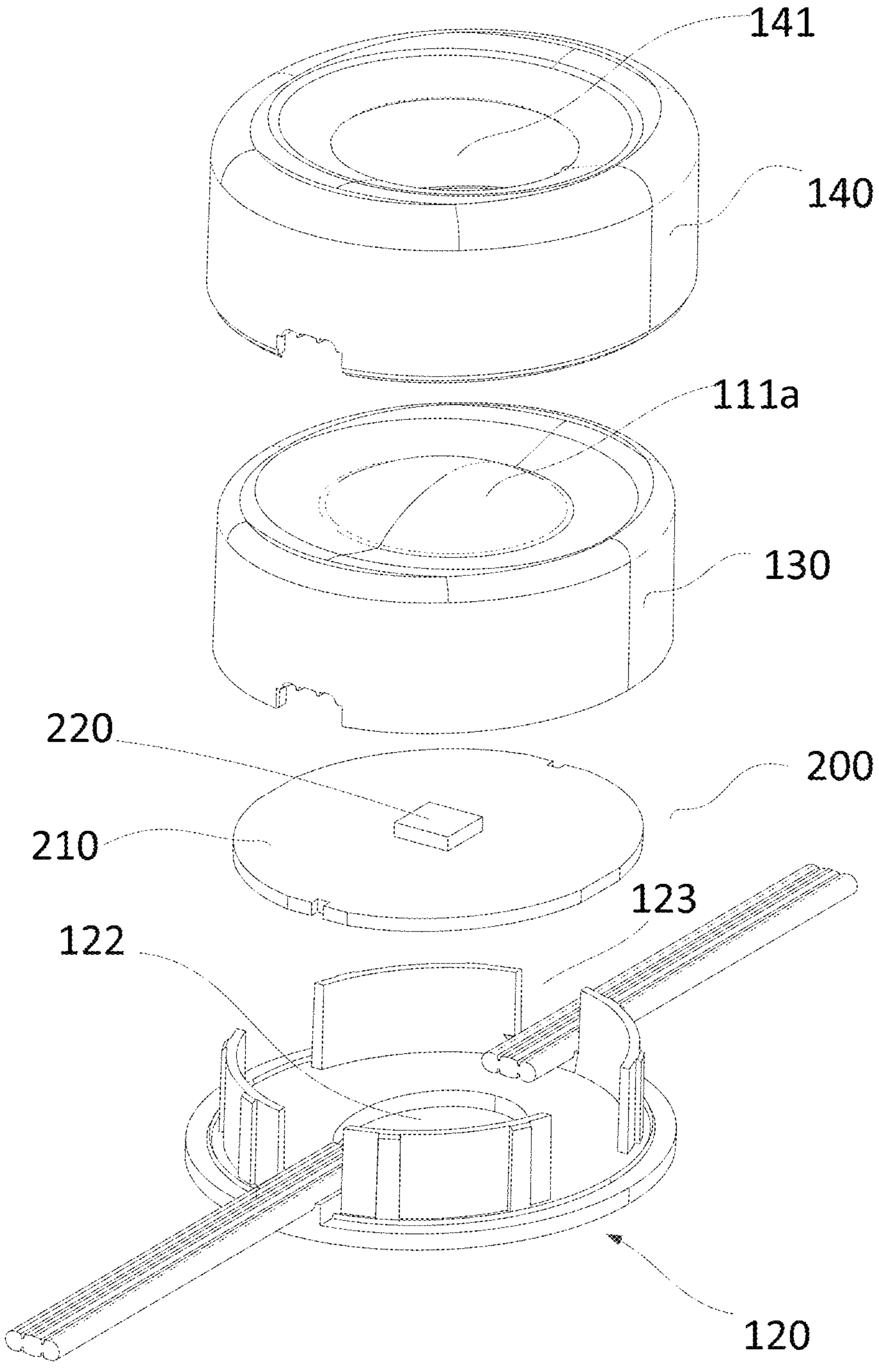
FIG. 6 is an exploded view of the light source module according to another embodiment of the present disclosure.

In combination with the first aspect of the present disclosure and the above-described implementations, in some embodiments, as shown in FIGS. 4 to 6, the housing 100 includes a transparent cover 130, a light-shielding cover 140, and the bottom housing 120. The light-shielding cover 140 defines a light transmission hole 141 and covers the transparent cover 130. The transparent cover 130 has the convex lens 111*a* that extends through the light transmission hole 141. The transparent cover 130 and the light-shielding cover 140 are both fixedly connected to the bottom housing 120. The light source module 10 in the present embodiments has a structure different from that described in the previous embodiments, and that is, the light-shielding cover 140 is arranged on the housing 100. By arranging the light-shielding cover 140, it is ensured that the light, which is emitted from the light source module 10 through the cover 111 having the lens, is brighter, when being viewed from a certain direction, than light emitted from an ordinary LED light bead 220. In addition, the light is more concentrated in a radiation direction of the light transmission hole 141, further improving a utilization rate of the light emitted from the LED light beads 220 and reducing light leakage from the light source module 10.

In combination with the first aspect of the present disclosure and the above-described implementations, in some embodiments, as shown in FIGS. 5 and 6, an end of the transparent cover 130 away from the convex lens 111*a* and an end of the light-shielding cover 140 away from the convex lens 111*a* are ultrasonically fused with the bottom housing 120. A side of the transparent cover 130 facing the bottom housing 120 is arranged with the convex ring 111*b*. The convex ring 111*b* abuts against the circuit board 210. The convex ring 1/1*b*, the transparent cover 130 and the circuit board 210 enclose to cooperatively define the isolation cavity 1/1*c* to receive the light-emitting module 200. The isolation cavity 1/1*c* is located at the position corresponding to the convex lens 111*a*. The circuit board 210 and the bottom housing 120 enclose to cooperatively define the cavity 121. A side of the bottom housing 120 away from the convex lens 111*a* defines the through hole 122 that is communicated with the cavity 121 and the exterior of the module. The bottom housing 120 defines two wire holes 123 that are opposite to each other. The two wire holes 123 are communicated with the cavity 121. The present disclosure provides another implementation of the housing 100, that is, the upper cover 110 includes two assembled portions, which are made of different materials, have colors and different light transmittance levels, and can be separatable from each other. In this way, the housing 100 can be manufactured easily. In addition, the above configuration enables a light-emitting portion of the housing 100 to be controllable, improving a concentration level of the light and improving brightness of the light source module 10 at a particular direction.

By arranging the convex ring 111*b* on the transparent cover 130, the convex ring 111*b* covers the light-emitting module 200, and in this way, the light emitted from the light-emitting module 200 is concentrated in the isolation cavity 111*c* between the convex ring 111*b* and the light-emitting module 200. The concentrated light is emitted only by passing through the convex lens 111*a* disposed in correspondence with the isolation cavity 111*c*, further improving the brightness of the light-emitting module 200. In addition, due to the isolation cavity **1*l*1***c* formed by the convex ring **1*l*1***b*, potential dust and water steam are prevented from entering and accumulating in the module, extending the service life of the module. By defining the through hole 122 in the bottom housing 120, heat dissipation of the circuit board 210 in the light source module 10 is effectively improved, ensuring that the heat generated by the circuit board 210, due to long-term operation, is transferred to the exterior of the module through the through hole 122. The wire holes 123 defined in the side plate 112 provide spaces for cable access. The wire holes 123 are communicated with the cavity 121, sufficiently enabling the through hole 122 to be communicated with the exterior of the module through the wire holes 123.

In a second aspect, embodiments of the present disclosure provide a decorative light string, as shown in FIG. 1, including a power adapter 40, a cable 50, and the light source module 10 as described in any one of the embodiments of the first aspect of the present disclosure. At least two light source modules 10 are arranged. The power adapter is electrically connected to the at least two light source modules 10 through the cable 50. Adjacent light source modules 10 of the at least two light source modules 10 are electrically connected to each other through the cable 50. By providing the light source module 10 in the present disclosure, the light emitting module 200 integrally encapsulates at least two independent LED light beads 220. Each LED light bead 220 is electrically connected to the circuit board 210 and has the operating voltage in the range of 6V-36V Distribution of components in the art in which a plurality of LED light beads 220 are connected to each other in series and encapsulated, has been changed. In the present disclosure, each LED light bead 220 is directly connected to the circuit board 210, complexity of a circuit of the light-emitting module 200 is significantly reduced, saving costs for manufacturing and materials.

Specifically, in some implementations of the embodiments of the second aspect, the decorative light string includes a switch box 20 and a plug 30. The switch box 20 is pluggably connected to the power adapter 40 via the plug 30. The light source module 10 is pluggably connected to the switch box 20 via the plug 30. The plug 30 is further configured to pluggably connect to another decorative light string to extend the decorative light string. Configuration of the switch box 20 and the plug 30 enables decorative light strings to be flexibly assembled to form the decorative light string in various scales.

Various technical features of the above-described embodiments may be combined arbitrarily with each other, and not all possible combinations of the various technical features of the above-described embodiments are described in order to provide concise description. However, as long as no contradiction is caused in combinations of the technical features, all combined technical features shall be considered as being within the scope of the present disclosure.

The above-described embodiments show only various embodiments of the present disclosure, which are described in a more specific and detailed manner. The description shall not be interpreted as a limitation of the scope of the present disclosure. It should be noted that, any ordinary skilled person in the art may perform various deformations and improvements without departing from the concept of the present disclosure. The deformations and improvements are within the scope of the present disclosure. Therefore, the scope of the present disclosure shall be subject to the attached claims.

What is claimed is:

1. A light source module, comprising:

a housing, comprises an upper housing and a bottom housing, the upper housing and the bottom housing cooperatively define a receiving space;

a circuit board, received in the receiving space of the housing; the circuit board and the bottom housing enclose to cooperatively define a cavity; a side of the bottom housing away from the circuit board defines a through hole that is communicating with the cavity and an exterior of the module, the through hole being used for heat dissipation; and a light-emitting module, received in the receiving space, and comprising at least two independent LED light beads that are integrally encapsulated and are configured to generate at least two colors of light correspondingly; wherein, each of the at least two independent LED light beads, realized by performing a multi-core encapsulation technology, is electrically connected to the circuit board and has an operating voltage in a range of 6V-36V.

2. The light source module according to claim 1, wherein, the at least two independent LED light beads 220 at least comprise a R-type light bead, a G-type light bead, and a B-type light bead; and each of the at least two independent LED light beads 220 has an operating voltage of 18V.

3. The light source module according to claim 2, wherein, the upper housing comprises a cover plate and a side plate extending along an edge of the cover plate; the cover plate and the side plate are integrally formed as a one-piece structure; the side plate is fixedly connected to the bottom housing; the cover plate, the side plate, and the bottom housing cooperatively define the receiving space; the cover plate has a convex lens that allows light to pass through and is disposed at a position corresponding to the light-emitting module.

4. The light source module according to claim 3, wherein, an end of the side plate away from the cover plate is ultrasonically fused with the bottom housing to seal a gap between the upper housing and the bottom housing.

5. The light source module according to claim 3, wherein, the upper housing comprises a convex ring that is integrally formed with the cover plate; the convex ring is protruding from a side of the cover plate away from the convex lens; the convex ring abuts against the circuit board; the convex ring, the cover plate and the circuit board enclose to cooperatively define an isolation cavity to receive the light-emitting module; the isolation cavity is located in correspondence with the convex lens.

6. The light source module according to claim 3, wherein, the side plate defines two opposing wire holes that are opposite to each other; the two wire holes are communicated with the cavity.

7. The light source module according to claim 2, wherein, the housing comprises a transparent cover, a light-shielding cover, and the bottom housing; the light-shielding cover defines a light transmission hole and covers the transparent cover; the transparent cover has the convex lens that extends through the light transmission hole; the transparent cover and the light-shielding cover are both fixedly connected to the bottom housing.

8. The light source module according to claim 7, wherein, an end of the transparent cover away from the convex lens and an end of the light-shielding cover away from the convex lens are ultrasonically fused with the bottom housing; a side of the transparent cover facing the bottom housing is arranged with the convex ring; the convex ring abuts against the circuit board; the convex ring, the transparent cover and the circuit board enclose to cooperatively define the isolation cavity to receive the light-emitting module; the isolation cavity is located at a position corresponding to the convex lens; the circuit board and the bottom housing enclose to cooperatively define a cavity; a side of the bottom housing away from the convex lens defines a through hole that is communicated with the cavity and the exterior of the module; the bottom housing defines two wire holes that are opposite to each other; the two wire holes are communicated with the cavity.

9. A decorative light string, comprising: a power adapter, a cable and at least two light source modules, wherein, each of the at least two light source modules is the light source module according to claim 1; the power adapter is electrically connected to the at least two light source modules through the cable, and adjacent light source module of the at least two light source modules are electrically connected to each other through the cable.

10. The decorative light string according to claim 9, wherein, the decorative light string comprises a switch box and a plug, the switch box is pluggably connected to the power adapter via the plug, the at least two light source modules are pluggably connected to the switch box via the plug, and the plug is further configured to pluggably connect to another decorative light string in order to extend the decorative light string.

* * * * *